US007652275B2

(12) United States Patent
Gladnick (10) Patent No.: US 7,652,275 B2
(45) Date of Patent: Jan. 26, 2010

(54) NON-CONTACT PROBE CONTROL INTERFACE (75) Inventor: Paul Gladnick, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 579 days.

(21) Appl. No.: 11/494,972

(22) Filed: Jul. 28, 2006

(65) Prior Publication Data
US 2008/0024793 A1    Jan. 31, 2008

(51) Int. Cl.
*G01N 21/86* (2006.01)
*G01C 3/08* (2006.01)
*G01R 27/26* (2006.01)

(52) U.S. Cl. .................. 250/559.19; 356/3.01; 324/690

(58) Field of Classification Search ............ 250/559.19, 250/310, 339.13, 341.1, 352, 208.1, 214 R, 250/231.11, 231.18; 356/310, 326, 328, 356/330, 3.01, 4.5, 375, 603, 623; 359/3, 359/4; 324/690; 33/502–504
See application file for complete search history.

(56) References Cited

U.S. PATENT DOCUMENTS

| | | | |
|---|---|---|---|
| 4,191,969 A | 3/1980 | Briand et al. | |
| 4,380,027 A | 4/1983 | Leventer et al. | |
| 4,453,082 A | 6/1984 | Pryor | |
| 4,539,595 A | 9/1985 | Warner | |
| 4,631,586 A | 12/1986 | Gennetten et al. | |
| 4,908,951 A | 3/1990 | Gurny | |
| 5,125,035 A | 6/1992 | McCarthy et al. | |
| 5,175,601 A | 12/1992 | Fitts | |
| 5,214,857 A | 6/1993 | McMurtry et al. | |
| RE35,409 E | 12/1996 | Moore | |
| 5,615,489 A | 4/1997 | Breyer et al. | |
| 5,825,666 A | 10/1998 | Freifeld | |
| 6,064,440 A | 5/2000 | Born et al. | |
| 6,081,381 A | 6/2000 | Shalapenok et al. | |
| 6,128,077 A * | 10/2000 | Jovin et al. ................. 356/310 |
| 6,493,361 B1 | 12/2002 | Yamaguchi et al. | |
| 6,573,931 B1 | 6/2003 | Horii et al. | |
| 6,591,060 B1 | 7/2003 | Buckley et al. | |
| 6,643,024 B2 | 11/2003 | Deck et al. | |
| 6,798,928 B2 | 9/2004 | Iida et al. | |
| 6,948,255 B2 | 9/2005 | Russell | |

(Continued)

OTHER PUBLICATIONS

*Renishaw Machine Checking Gauge User's Guide*, H-1000-5080-03-A, Renishaw PLC, © Jun. 2002.

*Primary Examiner*—Georgia Y Epps
*Assistant Examiner*—Don Williams
(74) *Attorney, Agent, or Firm*—Christensen O'Connor Johnson Kindness PLLC (57) ABSTRACT

A probe control interface is provided for a structured light non-contact coordinate measuring machine probe. Portions of a video control signal for controlling the grey level of selected rows of pixels of a spatial light modulator of the probe can be decoded into control signals for additional probe components or functions that have been added to increase the measuring capabilities or versatility of the non-contact probe. By providing the additional probe component control signals in this manner, a versatile structured light non-contact probe system can be made compatible with a standard probe head autojoint system (e.g. a Renishaw™ type system), thus allowing the probe to be automatically exchanged with other standard probes and allowing existing systems to use the non-contact probe more easily. Various aspects of the probe control interface allow for relatively simple, compact, lightweight and robust implementation.

18 Claims, 8 Drawing Sheets

U.S. PATENT DOCUMENTS 6,951,060 B2 10/2005 Groell
7,039,550 B2 5/2006 Noda
2005/0207160 A1 9/2005 Babayoff et al.

* cited by examiner

| Connection number | Function | Description |
|---|---|---|
| 2 | Gnd (SLM) | (+15V, 0.2 A max. single conductor) |
| 3 | HSYNC (SLM) | SLM control |
| 4 | VSYNC (SLM) | SLM control |
| 5 | 2-wire touch prb sig - reserved | For standard probe |
| 6 | SLM Video | SLM analog control |
| 7 | +24 V (0.35 A) | SLM, laser, dc motor |
| 8 | GND (power) | Power ground return |
| 1 | Analog video signal out | 75 Ohm impedance (coax) |
| 15 | Coax shield | Connected to 0V in probe interface (may be loaded by resistor to pin 13) |
| 9 | Probe ID - reserved | Resistor measurement (0V reference) |
| 10 | Screen/Shield - reserved | Connection link from cable screen to probe/probe head body |
| 11 | +12 V (0.35 A) Power | CCD |
| 12 | Touch probe 0V & 2-wire return - reserved | Return connection for 0V & 2-wire probe |
| 13 | No connection | |
| 14 | No connection | |
| 16 | Screen | Connection between probe & probe cable |

NON-CONTACT PROBE CONTROL INTERFACE

FIELD OF THE INVENTION

The invention relates generally to precision measurement instruments, and more particularly to a non-contact probe control interface that is used in a coordinate measuring machine.

BACKGROUND OF THE INVENTION

In one type of coordinate measuring machine, the surface of a workpiece is scanned with a probe. After the scan, a three dimensional profile of the workpiece is provided. In one type of scanning probe, the workpiece is directly measured by touching a mechanical contact of the probe to various points along the workpiece surface. In some cases, the mechanical contact is a ball.

In other coordinate measuring machines, an optical probe is utilized which measures the workpiece without making physical contact with the surface. Certain optical probes utilize light points (such as triangulation probes), as well as mostly so-called video probes, which comprise video cameras which detect a greater portion of the workpiece surface. In some systems, the coordinates of the geometric elements of the workpiece are determined via image processing software.

Certain "combined" coordinate measuring machines that use both optical and mechanical measuring are also known. One such device is described in U.S. Pat. No. 4,908,951. The described apparatus has two spindles, one that carries the mechanical probe, and one that holds a video camera having a beam path into which a laser probe is simultaneously reflected for making measurements in the Z-coordinate, that is, along the optical axis of the video camera.

U.S. Pat. No. 5,825,666 describes an optical coordinate measuring machine wherein an optical touch probe of the device has a first target on the distal end thereof, on the contact element of a standard probe. The standard probe is mounted to a video camera to image the target on the camera. Movement and position of the target in the X and Y coordinates is indicated by the machine's computer image processing system. A second target is mounted to the proximal end of the probe and indicates movement and position in the Z coordinate. The second target may obscure a photo detector, but preferably is parfocused on the camera by a light beam parallel to the X,Y plane. Preferably there are two second targets illuminated by orthogonal beams parallel to the X,Y plane. Rotation around the Z axis then may be calculated by the computer when star probes are used. Auto changing racks are also disclosed for holding multiple probes, a probe holder, and lenses for selective mounting on the camera.

Measuring probes are frequently interchangeably attached to coordinate measuring machines by various "probe heads". At present, Renishaw™ probes heads are the most commonly used for certain applications in the industry. These probes heads are manufactured by Renishaw Metrology Limited in Gloucestershire, United Kingdom. While Renishaw type probe head systems are the most commonly used in the industry, certain machine vision type technologies are not easily incorporated into Renishaw type systems. Furthermore, attempts to upgrade an existing Renishaw type system to one with more advanced capabilities (e.g. certain machine vision type technologies) can entail significant costs and/or inconvenience. For example, certain machine vision type technologies adapted to a Renishaw type probe head system may lack desirable features, lack a desirable level of controllability, and/or lack the capacity for being automatically interchangeable with other types of probes that may be interfaced to the Renishaw type probe head system. One particular issue with regard to using Renishaw type probe head systems, is that the existing connections between the machines and the probes contain a limited number of wired connections, which essentially forms a "bottleneck" which makes it difficult to add additional technologies and/or features to a compatible probe, due to the lack of physical wires for carrying a desirable number of control and data signals.

The present invention is directed to providing an apparatus that overcomes the foregoing and other disadvantages. More specifically, a non-contact probe control interface is provided which allows more advanced measuring capabilities and functions to be used with an existing probe head system (e.g. a Renishaw type system), or a probe head system that provides a limited number of wired connections.

SUMMARY OF THE INVENTION

A non-contact probe control interface is provided. In accordance with one aspect of the invention, control signals directed through a probe head to a spatial light modulator of a non-contact probe may include embedded signals that can be decoded into control signals for other elements of the non-contact probe. In various embodiments, signals for selected rows of pixels in the spatial light modulator video signal are made to have grey level values that can be decoded into control signals for the other elements of the contact probe. The control signals that are determined from each of the grey levels of each of the rows may be utilized to control various components (e.g. a laser, a motor of a rotating diffuser disk, a camera, etc.) As an example, the grey level of a first row may be converted to a value that is used as a control signal for a laser, while the grey level of a second row may be converted to a value that is used as a control signal for a camera, etc. The grey levels for each of the "control" rows of pixels are fed into the spatial light modulator and projected, but are not processed as part of the surface analysis, and thus do not have to be stripped out of the video signal from a camera. By having the grey level constant for a selected portion of a selected row (in one embodiment for the entire row), the grey level signal is long enough that it can be sampled and held without concerns regarding critical timing for obtaining an accurate signal. It will be appreciated that this allows for a relatively simple implementation and decoding scheme. In short, rather than requiring the probe to have extra physical wires for carrying the control signals for the additional components (e.g. a laser, a motor of a rotating diffuser disk, a camera, etc.) the additional control signals may instead be encoded in selected rows (e.g. the first few rows) of the spatial light modulator video signal which may already be carried in standard probes in a standard video signal line (e.g. such as in a standard Renishaw type system.)

In accordance with another aspect of the invention, the number of connections on an autojoint for the probe are made to be consistent with existing systems. For example, existing Renishaw type systems typically have standard connections with a standard number of pins (e.g. 13 pins). By providing an autojoint with standardized connections, existing systems can be upgraded more easily.

In accordance with another aspect of the invention, the spatial light modulator patterns are able to be modified. This allows for the utilization of existing spatial light modulator signals in existing systems, while providing additional information for the control signals for the other elements of the non-contact probe.

In accordance with another aspect of the invention, a variety of spatial light modulator patterns, ranging from coarse to fine, are projected on each portion of the workpiece surface that is to be measured. The finer patterns are intended to generally provide more accurate measurements, while the coarser patterns help avoid phase ambiguity and provide reference points that are more easily discerned. In general, each of the patterns comprises a series of stripes that cover a patch of the workpiece. A camera is placed at an angle with regard to the surface, so that the stripes appear as contour lines. The offset portions of the contour lines are indicative of raised surface features (as opposed to a straight line which would be indicative of a flat surface). The offset portions are therefore indicative of the Z-height of the surface features on the workpiece, which can be calculated in accordance with a triangulation formula, as determined in part by the angular orientation and distance of the camera relative to the nominal projection plane on which the pattern appears. The information from each of the contour stripes can then be accurately recombined to produce a 3-D surface map for the measured surface of the workpiece. By utilizing a series of such patterns which range from coarse to fine, the rough locations of surface features can be determined by the coarser patterns, while more accurate measurement data may be determined with the finer patterns. If only the finer patterns were utilized, in some embodiments confusion might result in the obtained image data with regard to which line of the pattern was being viewed. By using coarser patterns, the system is more accurately able to determine which line of the pattern is being viewed, and thus rough locations of surface features may be determined, after which the finer patterns may be utilized to obtain more accurate measurement data with regard to the surface features.

In accordance with another aspect of the invention, the laser of the system is controlled to provide sufficient energy to illuminate a variety of workpieces. In combination with the laser, a rotating diffuser is utilized to avoid speckle patterns which could otherwise reduce the accuracy of the system.

In accordance with another aspect of the invention, a decoder portion inputs a synchronizing pulse wherein the grey level value of a selected pixel row is sampled after a predetermined interval from the time the synchronizing pulse occurs.

In accordance with another aspect of the invention, a probe interface circuit provides a signal that is an amplified version of the grey level value that is sampled from a control pixel row. In one embodiment, these amplified versions of the sampled grey level values may be utilized directly as control signals for the various circuit elements. As an example, in an embodiment where the spatial light modulator signals have a maximum value of 0.73 volts and the control signals have a maximum value of 4.0 volts, the analog values of the grey levels of the pixels which range from a minimum of 0 volts to a maximum of 0.73 volts can be amplified by approximately 5.48 times, so as to produce signals which range from 0 volts to 4.0 volts and which in some cases may be utilized directly as control signals for various circuit elements.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
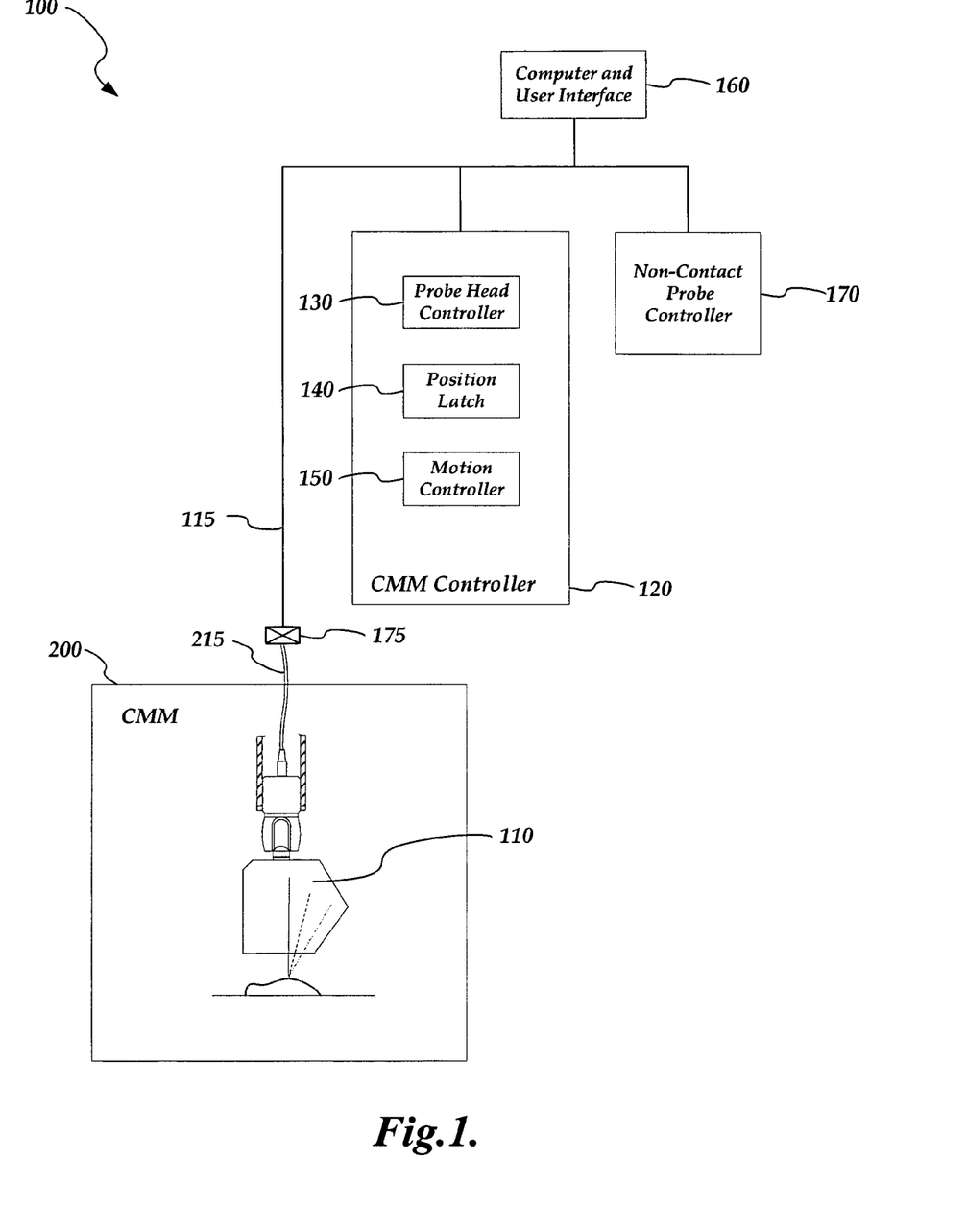
FIG. 1 is a block diagram of a coordinate measurement system with a coordinate measurement machine, a structured light probe, controllers and a user interface.

FIG. 1 is a diagram of a coordinate measurement system 100. The coordinate measurement system 100 includes a coordinate measurement machine controller 120, a computer and user interface 160, a probe controller 170 and a coordinate measurement machine 200. The controller 120 includes a probe head controller 130, a position latch 140 and a motion controller 150. The coordinate measurement machine 200 includes a non-contact structured light probe 110.

The coordinate measurement machine 200 communicates with all of the other components through a data transfer line 115 (e.g. a bus), which is connected by a connector 175 (e.g. a "micro-D" type connector) to a probe head cable 215 which provides signals to and from the non-contact structured light probe 110. The coordinate measurement machine 200 is controlled by the coordinate measurement machine controller 120, while the non-contact structured light probe 110 is controlled by the probe controller 170. The user may control all of the components through the computer and user interface 160.

Figure 2:
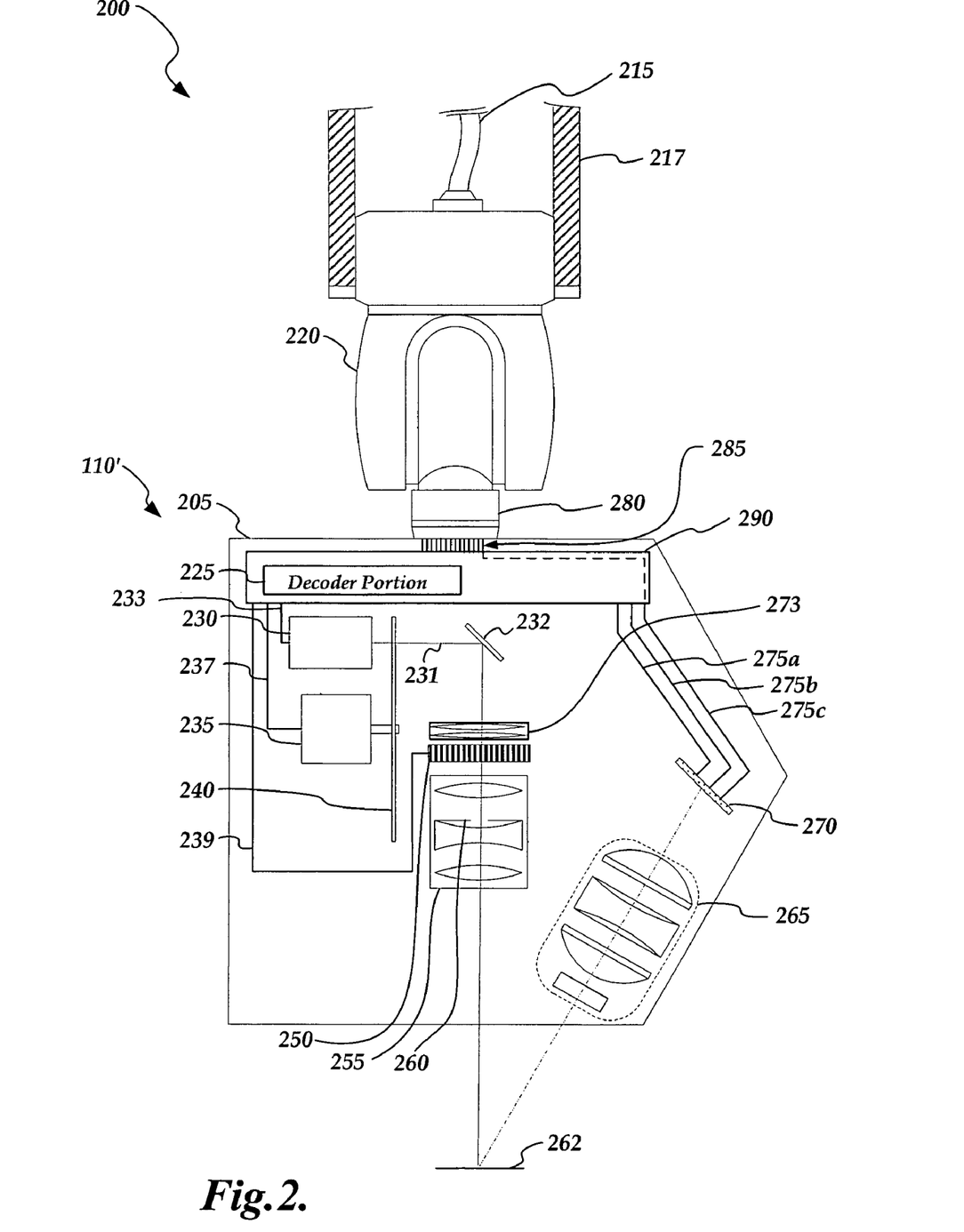
FIG. 2 is a diagram illustrating the internal components of a first exemplary embodiment of the structured light probe of FIG. 1.

FIG. 2 is a diagram schematically illustrating certain components of the coordinate measurement machine 200 and a non-contact structured light probe 110' which is one exemplary embodiment of the non-contact structured light probe 110 of FIG. 1. The probe 110' includes a probe housing 205, a laser 230, a mirror 232, a motor 235, a rotating diffuser disc 240, a spatial light modulator 250, projection optics 255, camera optics 265, a camera 270, illumination optics 273, and probe control interface electronics 290. The probe head 220 receives and transmits probe signals through the probe head cable 215. The probe head 220 is secured to a coordinate measurement machine quill 217. The probe head 220 is connected to the probe 110' by a probe autojoint connection 280 which will be described in more detail below with reference to FIG. 6.

The probe head 220 in some embodiments rotates in 360 degrees in a horizontal plane and contains a type of U-joint. The probe autojoint connection 280 is an electro-mechanical connection that fastens the probe head 220 rigidly and mechanically to the structured light probe 110', in a way such that it can be disconnected from one probe and attached to another. In one embodiment, the probe autojoint connection 280 has spring-loaded electrical contacts so that when a probe is attached, the contacts automatically engage and make electrical connections. In some embodiments, this connection method can cause the system to have a relatively high amount of signal noise, which as will be described in more detail below makes it advantageous to use certain configurations and methods according to this invention which can function effectively in a relatively noisy environment.

The structured light probe 110' receives its control signals through the autojoint connection 280. The signals passed to the structured light probe 110' through the autojoint connection 280 are passed through connection lines 285 to the probe control interface electronics 290. The probe control interface electronics 290 include a decoder portion 225 which uses known circuit and/or software technologies for providing signal processing operations which are described in more detail below with reference to the timing diagram of FIG. 7. The probe control interface electronics 290 send and receive signals through various signal lines that will be described in more detail below, including a laser power and control line 233, a motor power and control line 237, a spatial light modulator power and control line 239, a camera trigger and control line 275a, a camera power line 275b and an analog video out line 275c.

For the operation of the structured light probe 110', the laser power and control line 233 may in some embodiments be a minibus that provides control and a power line for the laser 230, which produces an illumination laser beam 231. The laser 230 is in one embodiment a solid state laser. In one example embodiment, the laser 230 may provide approximately 100 milliwatts of optical output.

In operation, the illumination laser beam 231 which is produced by the laser 230 passes through the rotating diffuser disk 240 and is directed to the deflecting mirror 232. The motor power and control line 237 controls the motor 235 to rotate the diffuser disk 240. The laser beam 231 may be approximately collimated prior to entering the rotating diffuser disk 240, which is used to eliminate speckle from workpiece images captured by the camera 270. In one example embodiment, the rotating diffuser disk 240 may provide an effective numerical aperture (NA) of a selected value (e.g. NA=0.5.) The rotating diffuser disk 240 outputs the laser beam 231 as diffuse light that diverges according to the provided NA, and that reflects from the mirror 232 to enter the illumination optics 273. The illumination optics 273 may approximately collimate the diffuse light and transmit it through the spatial light modulator 250. The light from the spatial light modulator 250 generally includes a structured light pattern that is projected (i.e. imaged) by the projection optics 255 onto a workpiece surface proximate to a nominal projection pattern plane 262. In one embodiment, the illumination optics 273 are designed to provide Koehler illumination, which may not be fully collimated when passing through the spatial light modulator 250, but may be sufficiently collimated for proper structured light illumination of a workpiece. In one embodiment, a first lens of the projection optics 255 may bring the structured light illumination from the spatial light modulator 250 to a focus point at the aperture 260, which may be used to control the depth of field of the structured light pattern image at the nominal projection pattern plane 262.

In one embodiment, the spatial light modulator 250 may be a commercially available spatial light modulator such as the Sony LCX017AL, available through Sony Corporation of America, New York, N.Y. The probe control interface electronics 290 may include a commercially available compatible chip set for receiving an analog video control signal and outputting corresponding signals that control the spatial light modulator 250. The spatial light modulator 250 is controlled by the power and control line 239 from the electronics 290, which may in one embodiment be a minibus and have thirty-two lines of parallel input. The spatial light modulator 250 may require minimal power (in one example embodiment it may only require a quarter of a Watt while the compatible chip set may require six Watts.)

The interface electronics 290 may receive input signals including an analog video control signal and other signals (as described in more detail below with respect to FIG. 7). After receiving the input signals, the electronics 290 converts the analog video control signal into digital control signals that configure the spatial light modulator 250 to display the proper pixel pattern. Then, the pattern is projected from the spatial light modulator 250 by the projection optics 255. The aperture 260 is an aperture stop that may be sized to provide acceptable image spatial resolution, minimize image aberrations, and provide acceptable energy throughput for the optics 255. It may also govern the depth of field of the projected image of the structured light pattern proximate to the nominal projection pattern plane 262, which is also the nominal focal plane of the camera optics 265. In one embodiment, the depth of field of both the projected structured light image and the camera optics 265 is approximately plus or minus six millimeters.

The angle of the camera optics 265 relative to the nominal projection axis of the structured light pattern provides a triangulation angle that provides Z-height information as the structured light image on a workpiece surface is mapped onto the imaging surface of the camera 270. The image from the camera 270 can be analyzed using known triangulation methods. In one embodiment, the camera 270 has control electronics that could either be in the electronics 290 or in the camera 270 itself (which can be an integrated camera system that has its own control circuits and/or software). The camera 270 may generally include certain timing functions, etc. which control integration time, sequence of operations, etc.

The camera trigger and control line 275a (which in some embodiments may comprise multiple wires), triggers the camera 270 to perform selected functions, and also may send more control signals that specifically control the integration time, etc. The power line 275b provides power to the camera 270. As shown, the analog video out line 275c includes a dashed line portion that indicates that the image data output from the camera 270 may bypass the rest of the electronics 290 and be routed directly to an external processing device (e.g. the non-contact probe controller 170), in that the output of the camera 270 may not need to be operated on by the probe control interface electronics 290. When the camera 270 relays its video data, the analog video out line 275c may in some embodiments comprise, or be connected to, a coaxial cable line that is intended to carry video signals. The analog video out line 275c may correspond to connection 1 in FIGS. 5 and 6, as will be described in more detail below.

As an overview of measurement operation, the structured light probe 110' utilizes the laser 230 and spatial light modulator 250 to project a structured light pattern (e.g. stripes) that covers a patch of the workpiece surface. From the view of the camera 270, a pattern of stripes appears as contour lines, the data from which may be combined to form a 3-D surface map of the workpiece. In other words, from the view of the camera 270, each of the stripes that is scanned across the surface of the workpiece will have offset portions that are indicative of the Z-height of the surface of the illuminated features on the workpiece, which can be calculated in accordance with a triangulation formula, as determined in part by the angular orientation and distance of the camera 270 from the nominal projection pattern plane 262. The information from each of the contour stripes can then be recombined to produce a 3-D surface map for the measured surface of the workpiece. The specific signals of the spatial light modulator 250 which produce the set of stripes which form the projected pattern will be described in more detail below with reference to FIGS. 7 and 8.

Figure 3:
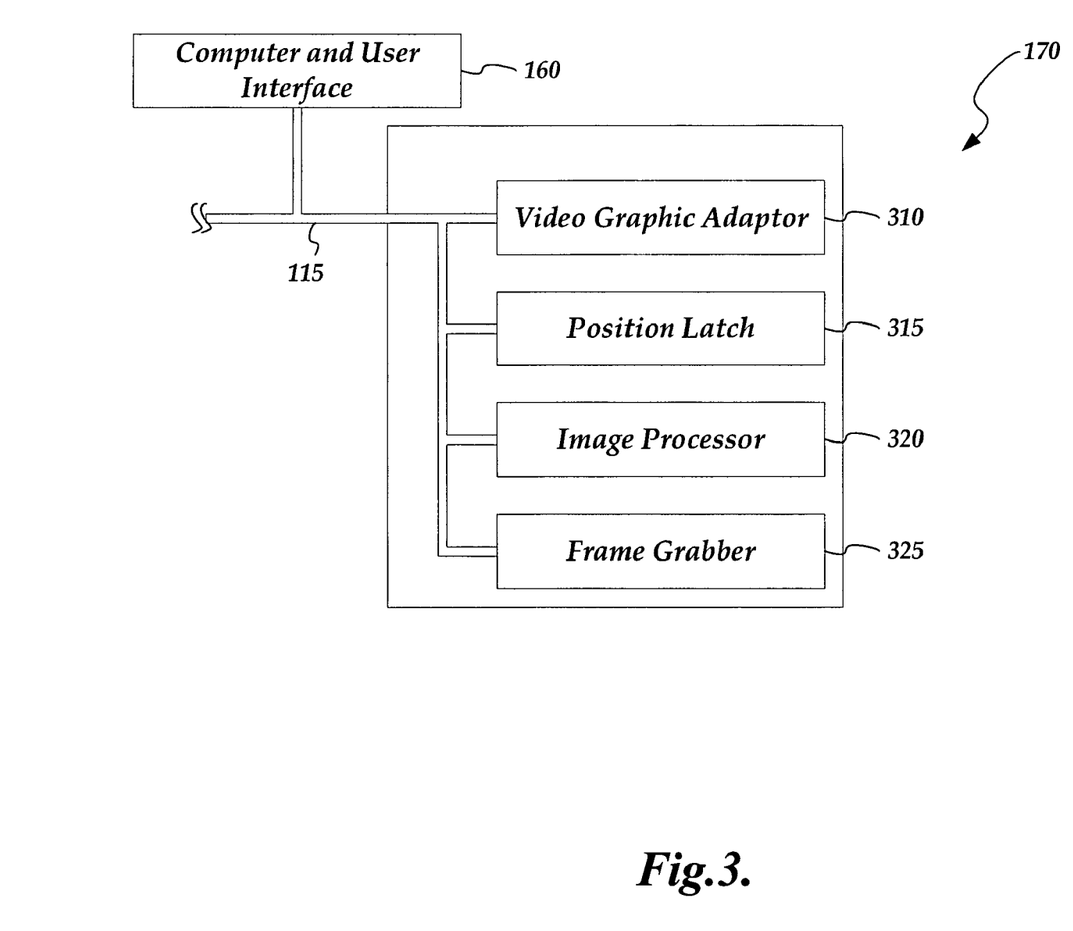
FIG. 3 is a block diagram illustrating the components of the probe controller of FIG. 1.

FIG. 3 is a block diagram of one embodiment of the computer and user interface 160 and the probe controller 170 of FIG. 1. As shown in FIG. 3, the probe controller 170 may include a video graphic adapter 310, a position latch 315, an image processor 320 and a frame grabber 325. The components of the probe controller 170 are coupled to one another and to the computer and user interface 160 by the data transfer line 115.

In operation, the video signal from the camera 270 is received by the frame grabber 325. In one embodiment, the frame grabber 325 may be a standard commercial frame grabber, of a type known in the industry. The frame grabber 325 may input an analog video image signal from the camera 270 and convert it into digital image data, which is output to the image processor 320.

The image processor 320 may in some embodiments be a separate processor or it may be a routine (e.g. such as may be located in the computer and user interface 160, or in a separate image processor on the computer, etc.) The image processor 320 analyzes the stripes returned by the camera 270 to determine the shape of the surface, and also may analyze the image data to determine if there are any saturated pixels, if there is good contrast in the image, and the like. If the image processor 320 determines that the image quality is too poor to support accurate measurements (e.g. is too light or too dark, etc.), then the image processor 320 may determine adjustments to the probe control signals in order to modify the probe configuration so that an acceptable image is produced.

The position latch 315 in one embodiment communicates with the position latch 140 in the coordinate measurement machine controller 120 in order to ensure that the coordinates of the coordinate measurement machine 200 at the time that an image is acquired are properly synchronized with the coordinate system of the image. In other words, the position latch 315 and the position latch 140 combine to ensure the accuracy of the measurements derived from each particular image.

The video graphic adapter 310 may be used to prepare and transmit control information for the spatial light modulator 250. The video graphic adapter 310 takes digital pixel configuration data, which may be prepared and input to the video graphic adapter 310 by the computer and user interface 160, and converts it into an analog video control signal format. The video graphic adapter 310 may also receive other probe control signal information, from the computer and user interface 160 or the image processor (or both), and embed the probe control signal information into the analog video control signal (e.g. the grey levels used for the pixel control) that is provided for controlling the spatial light modulator 250 in accordance with the present invention. Certain signals that are sent out by the video graphic adapter 310 will be described in more detail below with respect to FIGS. 7 and 8.

Figure 4:
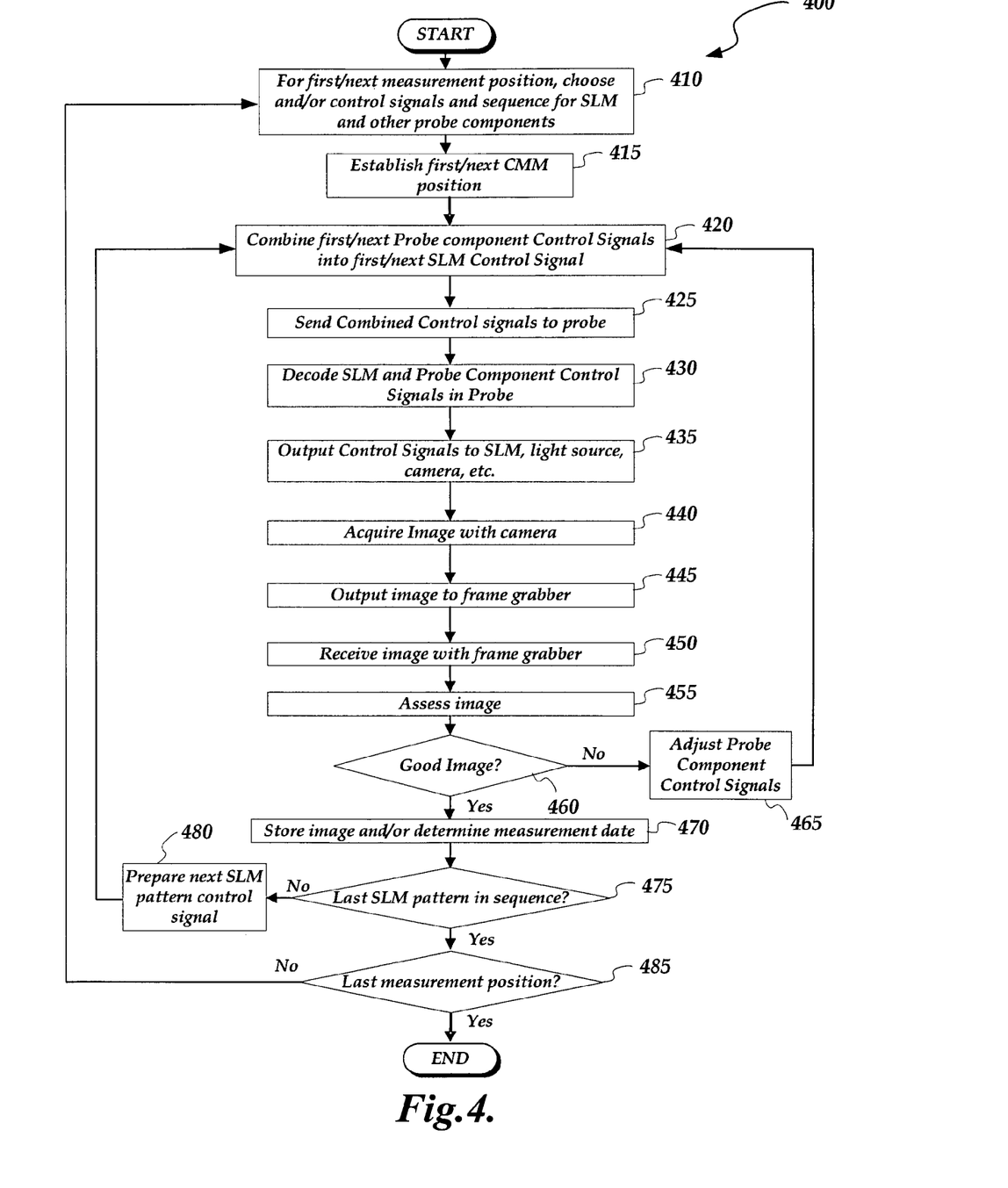
FIG. 4 is a flow diagram illustrating one exemplary embodiment of a routine for performing operations for controlling a non-contact structured light probe in accordance with the present invention.

FIG. 4 is a flow diagram illustrating one exemplary embodiment of a routine 400 for performing operations for controlling a non-contact structured light probe in accordance with the present invention. At a block 410, for the first/next measurement position relative to a workpiece, a user, or an automatic workpiece inspection program, that controls the coordinate measuring machine and the non-contact probe chooses and/or controls the sequence of the structured light patterns and the associated control signals that are directed to the probe to control the spatial light modulator (SLM) and other probe components. At a block 415, the coordinate measurement machine and/or probe are moved to establish a first or a next desired position of the probe relative to the workpiece (e.g. in x, y and z coordinates, and/or angular orientation). In various embodiments, various system components and/or control instructions may remain in an idle state until the position is established.

At a block 420, a set of first/next probe component control signals is combined into the first/next spatial light modulator control signal, for example, by embedding the control signals for the other probe components into the control signal for the spatial light modulator, by using the video graphic adapter 310, as previously outlined. At a block 425, the combined control signals are sent to the measurement probe, for example, by outputting the combined signals from the video graphic adapter 310 through the probe head cable 215 and the probe head 220 to the electronics 290.

At a block 430, the spatial light modulator and probe component control signals are decoded in the probe. For example, a spatial light modulator control signal including embedded probe component control signals may be input to the decoding portion 225 where the probe component control signals are extracted for controlling the various probe components, as outlined below with reference to FIGS. 7 and 8. The same spatial light modulator control signal may also be input (e.g. in parallel) to a portion of the electronics 290 that converts it to a form of control signals that are appropriate for directly controlling the spatial light modulator (e.g. a commercially available chip set may convert an analog input signal to digital signals that control the spatial light modulator, as previously outlined).

In various embodiments, certain pixels of the spatial light modulator may be controlled by the embedded control signals that are provided for controlling other probe components, and the control of those certain pixels may be inconsequential in terms of measurement operations related to the structured light pattern, as outlined further below. In various other embodiments, the probe component control signals may be embedded in vertical or horizontal blanking portions of a spatial light modulator control signal, and extracted and/or removed from the signal by the decoding portion 225, according to known methods. Some exemplary methods and circuits for encoding and decoding signals embedded in video signal blanking portions are disclosed in U.S. Pat. Nos. 6,064,440, 4,191,969, 6,573,931, and 6,591,060, each of which is hereby incorporated herein by reference in their entirety. However, such methods may be more complex, costly, less robust, and/or otherwise less desirable than various other methods disclosed herein. In particular, it should be appreciated that minimizing the size and weight of a non-contact probe is highly desirable. Also, as previously indicated, the types of wiring and connections in existing probe heads are not conducive to the reliable transmission of high speed signals (e.g. they may be susceptible to signal noise and/or crosstalk), therefore various simple methods disclosed herein for encoding and decoding probe component signals may be advantageous in various embodiments.

At a block 435, the appropriate control signals are output to their respective components such as the spatial light modulator, light source (e.g. laser), camera, etc. At a block 440, a structured light workpiece image is acquired with the camera. In one embodiment, the process for the image being acquired by the camera includes sending an initialization or trigger signal to the camera to initiate discharge of the pixels of the camera, which is followed by an image integration period having a duration that controls the image exposure.

At a block 445, the camera outputs the structured light workpiece image to a frame grabber, for example as previously outlined. At a block 450, the image is received by the frame grabber. At a block 455, the image may be assessed by a user, or by an automatic image assessment routine. For example, as previously indicated, the image data may be output from the frame grabber 325 to the image processor 320, which may analyze the image data to determine if there are any saturated pixels, if there is good contrast in the image, and the like, such that the image quality will support accurate measurements. At a decision block 460, a determination is made as to whether the image assessment indicates that the image is a good image. If the image is not a good image, then the routine continues to a block 465 where the probe component control signals may be adjusted to prepare for acquiring an improved image. For example, the image processor 320 may determine adjustments to the probe component control signals as previously outlined, after which the routine returns to the block 420. If at decision block 460 it is determined that the image is a good image, then the routine continues to a block 470, where the image is stored and/or analyzed to determine measurement data. For example, the image processor 320 may analyze the structured light pattern in the image to determine the shape of the workpiece surface.

At a decision block 475, if it is determined that the final spatial light modulator pattern in a sequence has not yet been processed, then the routine continues to a block 480, where the control signals for the next spatial light modulator pattern are chosen and/or prepared, after which the routine returns to the block 420. If at decision block 475 it is determined that the final spatial light modulator pattern in the sequence has been processed, then the routine continues to a decision block 485. At the decision block 485, if it is determined that the last measurement position has not yet been established, then the routine returns to the block 410. If at decision block 485 it is determined that the last measurement position has been processed, then the routine ends.

In FIG. 4, in one specific example embodiment certain frequencies are utilized for the steps of the routine. For example, the steps at the blocks 425, 430 and 435 may be performed nominally at 60 Hz. At the block 440, the step of acquiring the image with the camera may be performed nominally at 15 Hz. In some embodiments, 15 Hz is utilized because the process is light dependent in that it is desirable to provide enough integration time in order to obtain an acceptable image signal from certain types of surface pieces. Since the step at block 440 may therefore be performed more slowly, the system may be made to wait until the desired integration time is completed.

As described above with respect to FIG. 4, different spatial light modulator patterns are utilized. In one embodiment, the spatial light modulator patterns may range from coarse to fine, which provides certain advantages. In essence, by utilizing coarser patterns, surface heights adjacent to abrupt height transitions along the workpiece surface can generally be determined with greater ease and reliability, while finer patterns allow for more precise measurement information to be obtained. As the patterns are adjusted, certain of the control signals may be adjusted in accordance with the correspondingly different illumination energy and imaging requirements. In one specific example embodiment, twenty different patterns (i.e. twenty images) may be utilized for determining the final measurements associated with each portion or patch of the workpiece surface.

Figure 5:
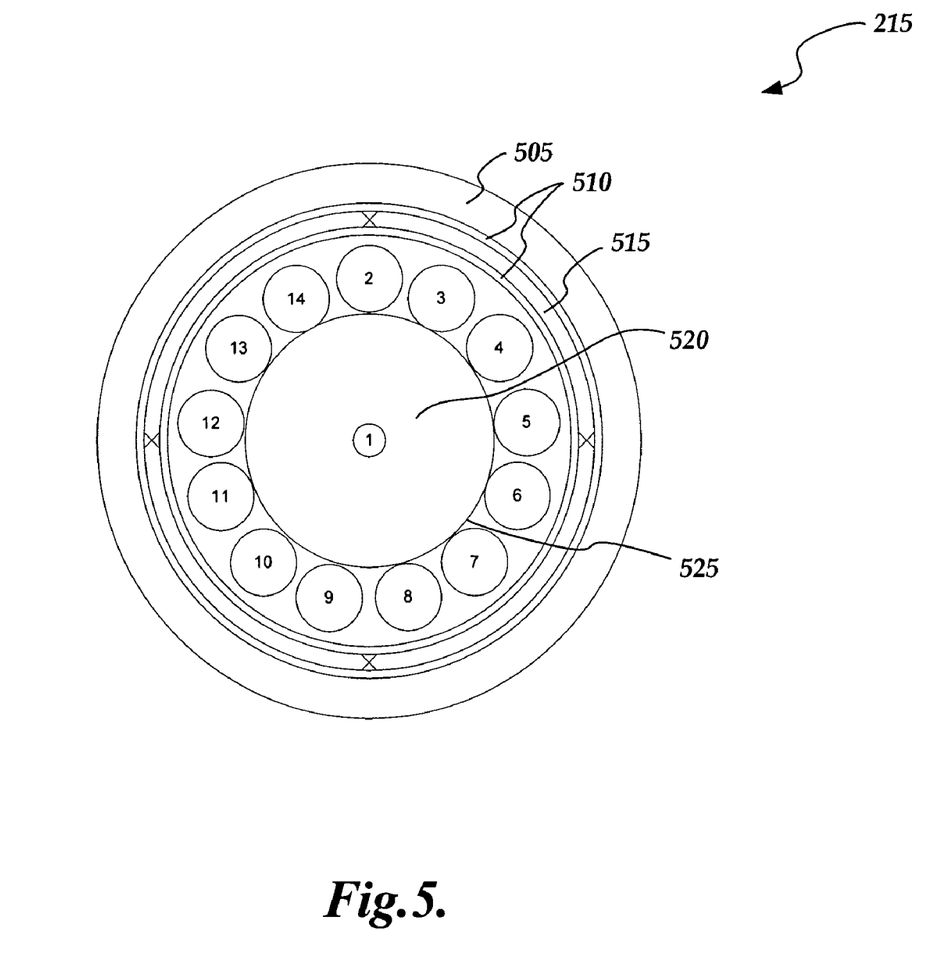
FIG. 5 a diagram illustrating a cross section of a probe data cable of FIG. 1.

FIG. 5 is a diagram illustrating a cross section of the probe data cable 215 of FIG. 1. As shown in FIG. 5, the probe data cable 215 includes a sheath 505, sealing tape layers 510, an electrical shield layer 515 and a coaxial cable 520 including a central conductor "1" and a shield layer 525. Additional conductors 2 through 14 are shown as surrounding the coaxial cable 520, in accordance with a conventional Renishaw™ configuration, as will be described in more detail below with reference to FIG. 6.

Figure 6:
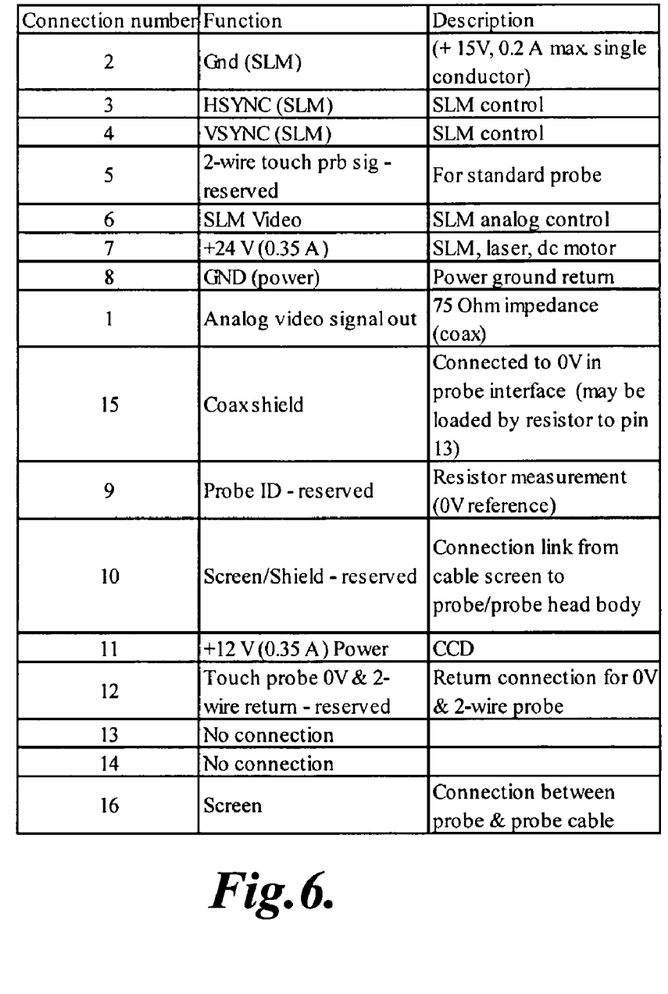
FIG. 6 is a table outlining one exemplary connection and/or signal scheme usable with the connection pins of an autojoint connection and the cable of FIG. 5.

FIG. 6 is a table outlining one exemplary connection and/or signal scheme usable with the cable of FIG. 5, and shows one exemplary set of pin connection assignments for the autojoint connection 280 of FIG. 2 in relation to conductors of the probe data cable 215. The connection numbers refer to spring loaded contact pin points of the autojoint 280 as described above, and may also indicate the conductor number of the cable 215 that is connected to a pin, unless otherwise indicated. The connection numbers are designated in accordance with one standard Renishaw™ autojoint connection configuration.

As shown in FIG. 6, the connection number 2 is designated as being for the ground signal of the spatial light modulator, and has a description of +15 volts, 0.2 amps max, and a single conductor. The connection number 3 is designated as being for the HSYNC signal for the spatial light modulator, which is a standard signal for various commercially available spatial light modulators. The connection number 4 is designated as being for the VSYNC signal for the spatial light modulator, which is a standard signal for various commercially available spatial light modulators. The connection number 5 is reserved and may be designated as being for a 2-wire touch probe signal (that is, for a standard probe that is automatically interchangeable with a non-contact probe according to this invention). The connection number 6 is designated as being for the spatial light modulator video analog control signal input. The connection number 7 is designated as being for a +24 volt (0.35 amp) signal, which may be provided to power the spatial light modulator, laser, motor, probe electronics, etc. The connection number 8 is designated as being for power ground return.

The connection number 1 is designated as being for the analog video signal out from the camera (75 ohm impedance-coax). The connection number 15 is designated as being for the coax shield layer 525, and is connected to 0 volts in the probe interface (which may be loaded by a resistor connected to connection number 13 in some embodiments). The connection number 9 is designated as being reserved and may be designated as being for probe identification (which may be provided by connecting it to a unique-valued resistor in each probe, to facilitate a measurement of a unique resistance-determined voltage relative to a 0 volt reference). The connection number 10 designated as being reserved for a connection from a cable screen or shield layer (e.g. shield layer 515 or the like) to the probe/probe head body. The connection 11 is designated as being for a +12 volt (0.35 amp) power signal for the camera. The connection number 12 is reserved and may be designated as being for a standard touch probe 0 volt and 2-wire return (the return connection for a 0 volt and 2-wire standard touch probe). The connection numbers 13 and 14 in one embodiment are not yet designated and thus are not assigned. The connection number 16 is designated as being for a screen being for a connection from a cable screen or shield layer (e.g. shield layer 515 or the like) to the probe. According to the above description, it will be appreciated that the number of connections available in an industry standard probe head cable and probe head are limited that the electromechanical configuration is not well-suited for isolation and transmission of high speed control signals. Thus, various interface signals and methods according to the this invention are adapted to provide the simplicity and reliability that is appropriate for operation in conjunction with such cables and probe head connections.

Figure 7:
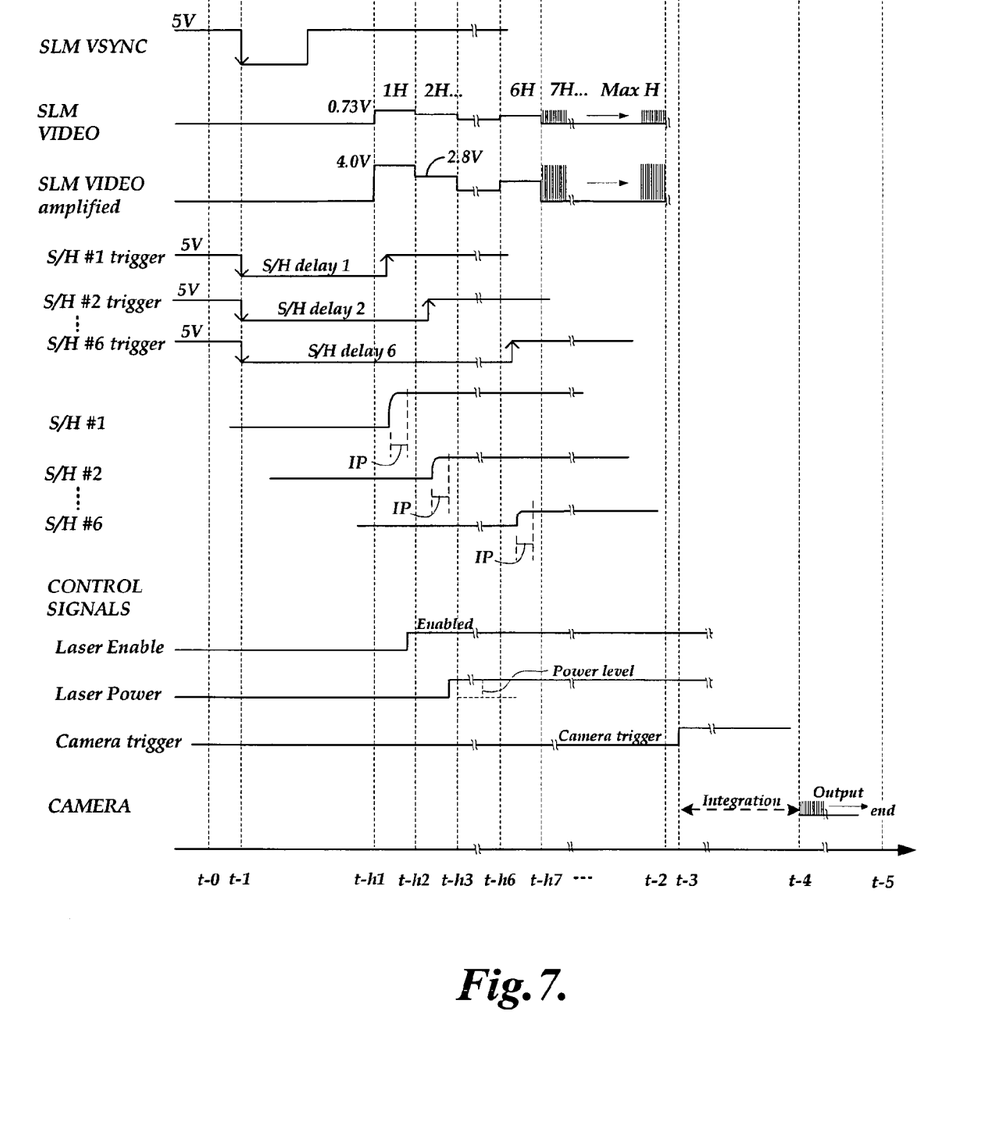
FIG. 7 is a diagram illustrating the relationships between the timing of one exemplary set of signals usable within the measurement system 100 of FIG. 1.

FIG. 7 is a diagram illustrating the relationships between the timing of one exemplary set of signals usable within the measurement system 100 of FIG. 1. At a time t-0, various signals are shown as being high (e.g. at 5 volts), including the signal SLM VSYNC, and the sample and hold trigger signals S/H #1 to S/H #6. The signal SLM VSYNC is a master timing signal for certain functions in various commercially available spatial light modulator signal decoder chip sets (as well as in selected custom SLM signal decoder applications). The signal SLM VIDEO is at 0 volts and is output by the video graphics adapter 310 of FIG. 3 and is provided on connection 6 of the autojoint connector 280 of FIG. 6, as described above.

At a time t-1, the signal SLM VSYNC goes low, and as a result the sample and hold trigger signals S/H #1 to S/H #6 (or any arbitrary number of sample and hold triggers) cause the related circuits to start their timing delays. In one embodiment, the sample and hold trigger signals may also be referred to as trigger delay timing signals. As a result of the signal SLM VSYNC going low, the spatial light modulator signal decoder chip set begins looking for the signal SLM VIDEO.

At a time t-h1, the signal SLM VIDEO rises to 0.73 volts, which may correspond to a pixel grey level of 255 (in another embodiment, another standard for the video out signal is 1.4 volts which corresponds to a grey level of 255.) In other words, starting at time t-h1, the signal SLM VIDEO begins to output information corresponding to pixel grey levels. For the signal SLM VIDEO, the signal levels over time are shown to correspond to the signals for various horizontal rows of pixels, including horizontal pixel rows 1H through 6H, which are used for control signals in this particular embodiment, and the rows 7H through max H, which are used for structured light pattern signals as will be described in more detail below with respect to FIG. 8.

The rise in the signal SLM VIDEO at the time t-h1 causes a corresponding rise in a signal SLM VIDEO amplified, which in one embodiment is a simple linear amplification of the signal SLM VIDEO. In one embodiment, the signal SLM VIDEO AMPLIFIED is produced so that it may sometimes be used to directly provide a control signal, as will be described in more detail below.

At a predetermined delay after the time t-h1, the sample and hold S/H #1 trigger signal goes high. The predetermined delay of the sample and hold S/H #1 trigger signal is timed to correspond to the portion of the SLM control signal (that is, the signal SLM VIDEO) corresponding to the first horizontal row of pixel data 1H of the spatial light modulator. After the sample and hold S/H #1 trigger signal goes high, this triggers a sample and hold circuit S/H #1 to integrate a signal over an integration period IP. After the integration period IP, the signal of the sample and hold circuit S/H #1 reaches its final value (or the value that is desired to be held) and at that point it automatically holds the signal at that level until it is reset (not shown) and the system proceeds to the next sample and hold operation.

Similar operations are repeated for the portions of the SLM control signal (that is, the signal SLM VIDEO) corresponding to the horizontal rows 2H to 6H of pixel data of the spatial light modulator. That is, the S/H #2 through S/H #6 trigger signals, result in the portions of the SLM control signal corresponding to the horizontal rows 2H to 6H being integrated and held on the sample and hold circuits S/H #2 to S/H #6. In one embodiment, there may be any number of the sample and hold trigger delays corresponding to the various "horizontal rows" of the spatial light modulator video control signal, as needed to decode a desired number of probe component control signals embedded in those "rows". The signals from the sample and hold circuits S/H #1 to S/H #6 carry the control signal information that is used to control the various probe components. As examples, in the particular embodiment of FIG. 7, the control signal LASER ENABLE is derived from the portion of the SLM control signal corresponding to the first horizontal row 1H, while the control signal LASER POWER LEVEL is derived from the portion of the SLM control signal corresponding to the second horizontal row 2H, etc.

In the embodiment shown in FIG. 7, the signals of the sample and hold circuits S/H #1 through S/H #6 are sampled from the signal SLM VIDEO amplified. By sampling from the amplified signal SLM VIDEO amplified, the signals of the sample and hold circuits S/H #1 through S/H #6 may in some cases be used directly as control signals, without requiring further processing. For example, as one example of a digital control signal, in the specific example of FIG. 7, the signal SLM VIDEO amplified is shown to have a value of approximately 4.0 volts when sampled by the sample and hold circuit S/H #1, which is a voltage sufficient to directly drive a TTL logic circuit to enable the laser. As one example of an analog control signal, in the specific example of FIG. 7, the signal SLM VIDEO amplified is shown to have a value of approximately 2.8 volts when sampled by the sample and hold circuit S/H #2, which is then used as an analog control voltage that controls the power output of the laser to provide a desired illumination level for image acquisition.

It will be appreciated that when the decoding operations described above are performed, the signal SLM VIDEO may also be input (e.g. in parallel) to a portion of the electronics 290 that converts it to a form of control signals that are appropriate for directly controlling the spatial light modulator (e.g. a commercially available chip set may convert the analog input signal SLM VIDEO to digital signals that control the spatial light modulator). Accordingly, in various embodiments, certain pixels of the spatial light modulator may be controlled by the embedded control signals that are provided for controlling other probe components, and the control of those certain pixels may be inconsequential in terms of measurement operations related to the structured light pattern, as outlined further below. For example, in various embodiments, the portions of the signal SLM VIDEO that control the horizontal pixel rows 1H to 6H, from the time t-h1 up to the time t-h7, will control all of the pixels of the rows 1H to 6H to the corresponding grey levels. However, the portion of the projected structured light pattern that corresponds to the peripheral pixel rows 1H to 6H of the spatial light modulator is easily prevented from being imaged by the camera and/or being included in the structured light image processing operations. Therefore, the grey level of these pixels rows may easily be made inconsequential with respect to the measurement operations of the probe.

It will be appreciated that the method of embedding and decoding probe component control signals in the portions of the SLM control signal corresponding to the horizontal rows 1H to 6H of the spatial light modulator, as outlined above, is simple to implement, and does not require high speed signals or signal processing, and thus can be made to be accurate and reliable. Furthermore, the method requires very little circuitry, which minimizes probe size, weight and power requirements, all of which are critical design factors. It will be appreciated that in various other embodiments, different parts of any or all of the horizontal rows 1H to 6H could be utilized for different control signals (e.g., to provide more probe component control signals or use fewer rows of the spatial light modulator pixels), but by making each of the horizontal rows correspond to a specific control signal, the timing and decoding circuitry is simpler and the system may be more robust. It will be appreciated that while in one embodiment only six horizontal rows 1H to 6H may need to be utilized to produce the desired corresponding control signals, if additional control signals are needed, additional horizontal rows could also be utilized.

It will be appreciated that the grey levels shown for the horizontal rows 1H to 6H of the signal SLM VIDEO may in one embodiment be set to values corresponding to 0 to 255. As an example, the signal LASER POWER may be proportioned within its range of control values according to the signal that is provided. The signal LASER POWER may be utilized to set the illumination brightness which may be controlled to adjust the exposure of an image. In other words, if an output image has certain undesirable characteristics, the control signals may be adjusted so as to "fix" the image, as outlined previously.

In the example shown in FIG. 7, for the portion of the signal SLM VIDEO provided over the time t-h7 to a time t-2, the grey levels of the horizontal pixel rows 7H to max H of the spatial light modulator are established, which fully establishes a corresponding structured light pattern. Nominally, all probe component control signals may be provided prior to the time t-h7 such that the controlled elements may settle to their desired states by the time t-2. The signal SLM VIDEO is shown to vary in accordance with the signals from the horizontal rows 7H to max H (shown with a compressed time scale, relative to other portions of FIG. 7). In one specific example embodiment, there may be 768 horizontal rows of pixels (in which case max H=768). As will be described in more detail below with respect to FIG. 8, the pixel data for the horizontal rows 7H to max H may form patterns of stripes on the work piece surface. These patterns of stripes, when imaged by the camera 270, form contour lines which allow various features of the work piece surface to be measured, as previously outlined.

At the time t-3, after the configuration of the spatial light modulator and the structured light pattern have been established, the signal CAMERA TRIGGER goes high (which may be provided after a predetermined delay, similar to the sample and hold trigger signals), and a camera image acquisition and output sequence begins. At a time t-4, the integration period for the camera ends and the analog image signal is output from the camera to the frame grabber. At a time t-5, the image signal that is output from the camera to the frame grabber is completed and the camera image acquisition and output sequence ends. Subsequently, the entire timing cycle may be repeated to acquire another workpiece measurement image, corresponding to another structured light pattern, and/or an adjusted set of probe component control signals, or the like, as previously outlined with reference to FIG. 4.

Figure 8:
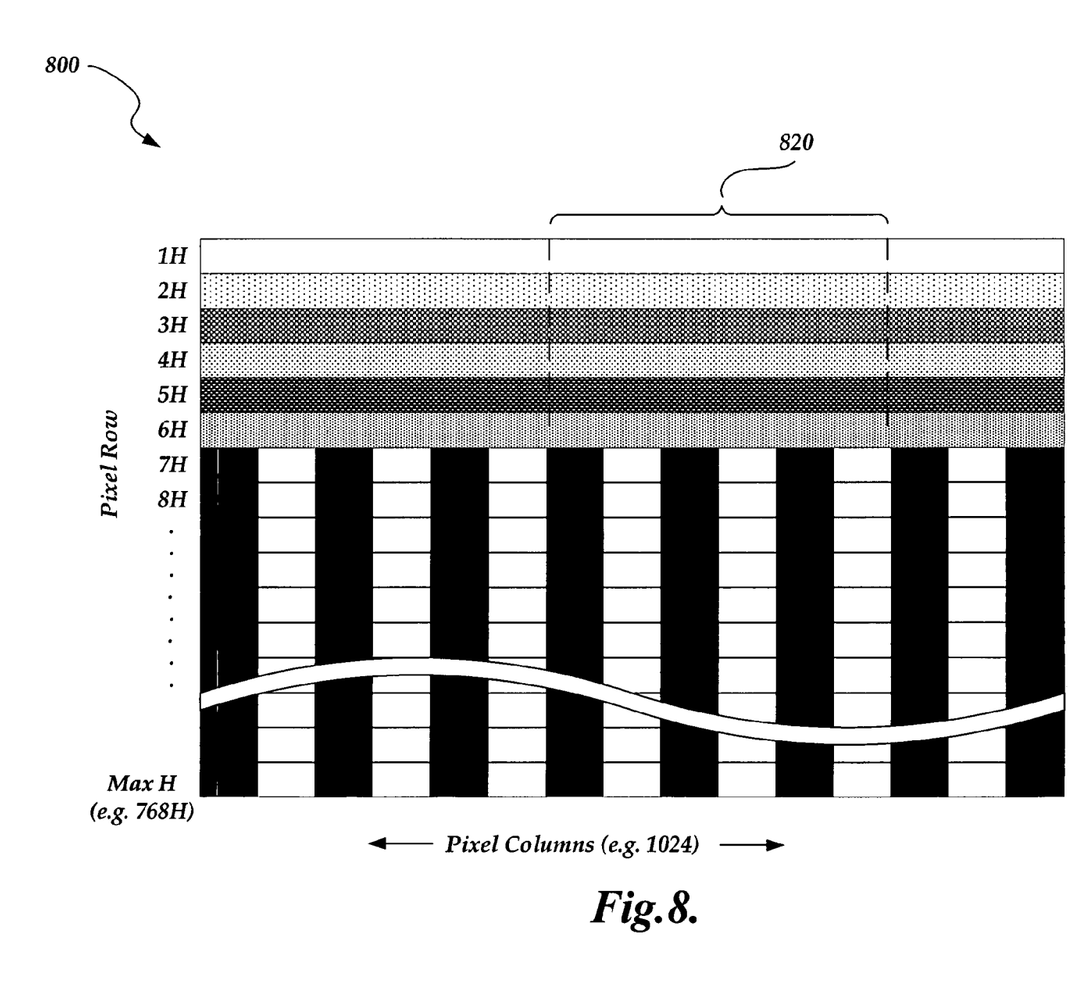
FIG. 8 is a diagram illustrating one/exemplary configuration of spatial light modulator pixels that is consistent with the probe component control signals embedded within the signal SLM VIDEO of FIG. 7.

FIG. 8 is a diagram illustrating one exemplary configuration of the spatial light modulator pixels, which is consistent with the probe component control signals embedded within the signal SLM VIDEO of FIG. 7. As described above, the probe component control signals may be embedded in the grey level signals for the horizontal pixel rows 1H through 6H, while the signals for a striped structured light pattern may be included in the horizontal pixel rows 7H through max H. In one example embodiment, the number of pixel columns may be 1,024.

A "sampling window" 820 is shown which corresponds to each of the integration time periods IP shown in FIG. 7. By making the grey level signals for the horizontal pixel rows 1H to 6H constant, a particularly simple and decoding method may be used, as outlined above.

As shown in FIG. 8, the first horizontal pixel row 1H is shown to have a grey level that is relatively light (approximately white), corresponding to a relatively large SLM control signal value. With respect to FIG. 7, this corresponds to the signal SLM VIDEO having a maximum signal level for the first horizontal row 1H, which is equal to the maximum voltage level of approximately 0.73 volts. This corresponds to the signal SLM VIDEO amplified having a level of approximately 4.0 volts, which is utilized directly for the signal LASER ENABLE for turning on the laser. The integration period IP of the signal of the sample and hold circuit S/H #1 corresponds to the sampling window 820 in row 1H.

For the second horizontal pixel row 2H, the grey level is shown to be slightly darker than the grey level of the first horizontal pixel row 1H, and thus the value of the signal SLM VIDEO corresponding to the row 2H is shown to be lower than that for the row 1H (in FIG. 7). For the signal of the sample and hold circuit S/H #2, the integration period IP corresponds to the sampling window 820 in row 2H. As previously outlined, this corresponds to the time the signal LASER POWER is sampled from the signal SLM VIDEO amplified, which is used directly as an analog control signal to control the power level of the laser.

For the horizontal pixel rows 7H through max H, signals are provided to the spatial light modulator for producing a striped pattern on the surface of the work piece as outlined above. As described above, when a pattern of stripes are imaged at the provided triangulation angle by the camera, in general, the imaged patterns of stripes will reflect the contours of the illuminated surface, and such images may be processed according to known techniques to provide a 3-D surface map of the workpiece surface.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The invention claimed is:

1. A structured light measuring probe for measuring the dimensions of a workpiece, the probe comprising:
   a structured light projection portion comprising an array-type spatial light modulator;
   a plurality of controllable probe elements comprising a camera; and
   a probe interface circuit,
wherein:
   the probe interface circuit inputs a first analog control signal that is included in the signals that are sent to the spatial light modulator; and
   the probe interface circuit comprises a decoder portion that is configured to process the first analog control signal, determine at least one probe element control signal from the first analog control signal, and output the probe element control signal to control at least one probe element that is not the spatial light modulator.

2. The measuring probe of claim 1, wherein the analog control signal is input to the probe interface circuit through a single input channel.

3. The measuring probe of claim 2, wherein the single input channel comprises a conductor configured to connect to a corresponding conductor in a coordinate measuring machine probe head.

4. The measuring probe of claim 1, wherein the plurality of probe elements comprises at least one of a laser light source and a rotating diffuser motor.

5. The measuring probe of claim 1, wherein the first analog control signal comprises an analog spatial light modulator control signal.

6. The measuring probe of claim 5, wherein the decoder portion is configured to determine the at least one probe element control signal based on information included in a coded portion of a pixel grey level control portion of the analog spatial light modulator control signal.

7. The measuring probe of claim 6, wherein the decoder portion inputs a synchronizing pulse that is synchronized with the analog spatial light modulator control signal, and the decoder portion is configured to determine a plurality of respective probe element control signals based on the amplitude of the coded portion of the pixel grey level control portion of the analog spatial light modulator control signal after a corresponding plurality of respective predetermined intervals from the time the decoder portion inputs the synchronizing pulse.

8. The measuring probe of claim 7, wherein the probe interface circuit is configured to provide a signal that is an amplified version of the analog spatial light modulator control signal, and the decoder portion is configured to determine the plurality of respective probe element control signals based on sampling the amplified version of the pixel grey level control portion of the analog spatial light modulator control signal at the corresponding plurality of respective predetermined intervals from the time the decoder portion inputs the synchronizing pulse.

9. The measuring probe of claim 8, wherein at least one respective probe element control signal is an analog control signal having a signal level that is substantially the same as the level sampled from the amplified version of the pixel grey level control portion of the analog spatial light modulator control signal at the corresponding respective predetermined interval from the time the decoder portion inputs the synchronizing pulse.

10. The measuring probe of claim 8, wherein at least one respective control signal is a digital control signal having a signal level that is substantially the same as the level sampled from the amplified version of the pixel grey level control portion of the analog spatial light modulator control signal at the corresponding respective predetermined interval from the time the decoder portion inputs the synchronizing pulse.

11. The measuring probe of claim 1, wherein the structured light measuring probe comprises a coordinate measurement machine autojoint connection and all insulated conductor power, ground and signal connections to and from the structured light measuring probe are made through connector pins included in the coordinate measurement machine autojoint connection.

12. The measuring probe of claim 11, wherein the coordinate measurement machine autojoint connection includes at most 14 connection pins.

13. The measuring probe of claim 11, wherein the coordinate measurement machine autojoint connection is in a standard configuration for Renishaw™ type machines.

14. The measuring probe of claim 11, wherein the probe is connected to a coordinate measurement machine system through the autojoint, and the coordinate measurement machine system comprises probe control electronics wherein the probe element control signals are combined with the spatial light modulator control signals and are output to the probe as a coded portion of the spatial light modulator control signals.

15. The measuring probe of claim 1, wherein the probe cycles through multiple spatial light modulator patterns to determine measurement data at a position relative to a workpiece, and probe element control signals are combined with each of the patterns.

16. The measuring probe of claim 1, wherein images of a workpiece surface are provided by the camera and for at least one image an analysis is performed regarding the quality of the image, and depending on the results of the analysis a probe element control signal is adjusted to provide a subsequent image having an improved image quality.

17. The measuring probe of claim 1, wherein the spatial light modulator produces a structured light pattern, and the probe element control signals determine a grey level of spatial light modulator pixels that determine the illumination projected at the periphery of the structured light pattern.

18. The measuring probe of claim 1, wherein the at least one probe element control signal comprises at least one of a control signal for enabling a laser illumination source, a control signal for controlling a laser illumination power level, and a control signal for controlling a motor for a rotating diffuser.

* * * * *

UNITED STATES PATENT AND TRADEMARK OFFICE
CERTIFICATE OF CORRECTION

| | | |
|---|---|---|
| PATENT NO. | : 7,652,275 B2 | |
| APPLICATION NO. | : 11/494972 | |
| DATED | : January 26, 2010 | |
| INVENTOR(S) | : Paul Gladnick | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 761 days.

Signed and Sealed this

Twenty-third Day of November, 2010

David J. Kappos
*Director of the United States Patent and Trademark Office*